United States Patent [19]
Husted

[11] Patent Number: 5,531,389
[45] Date of Patent: Jul. 2, 1996

[54] CONDIMENT MILL WITH A ONE-WAY CLUTCH

[76] Inventor: Wayne Husted, 415 Main St., Sausalito, Calif. 94965

[21] Appl. No.: 394,095

[22] Filed: Feb. 24, 1995

[51] Int. Cl.$^6$ ........................................... A47J 42/04
[52] U.S. Cl. ......................................... 241/169.1
[58] Field of Search .......................... 222/142.1–142.9; 241/168, 169, 169.1, 169.2, 285.1

[56] References Cited

U.S. PATENT DOCUMENTS

| | | | |
|---|---|---|---|
| 4,509,698 | 4/1985 | David | 241/169.1 X |
| 5,180,114 | 1/1993 | Chen | 241/169.1 |

*Primary Examiner*—Mark Rosenbaum
*Attorney, Agent, or Firm*—Rader, Fishman and Grauer

[57] ABSTRACT

A condiment mill adapted to grind condiments includes a mill body, a grinding unit, an elongated shaft, a clutch disc, and a mill top. The mill body defines an elongated mill cavity therein open at an upper end portion and open at a lower end portion. The mill body also has an engaging notch in the upper end portion. The grinding unit is disposed within the mill cavity proximate to the lower end portion and is positioned to receive unground condiment from the mill cavity. The elongated shaft is drivingly engaged with the grinding unit and extends upward therefrom toward the upper end portion of the body and is threaded at an upper end portion thereof. The clutch disc is rotatably fixed to the elongated shaft proximate to the upper end portion. The clutch disc has a clutching tooth extending therefrom operably engaging the notch in the body. The mill top has a threaded portion receiving the threaded upper end of the elongated shaft and also covers the clutch disc. Rotation of the mill top in a first direction relative to the mill body drives the grinding unit to grind the condiment in the cavity. Rotation of the mill top in a second direction causes the clutch disc to engage the body and the mill top to thereby unthread from the elongated shaft.

6 Claims, 2 Drawing Sheets

U.S. Patent     Jul. 2, 1996     Sheet 1 of 2     5,531,389
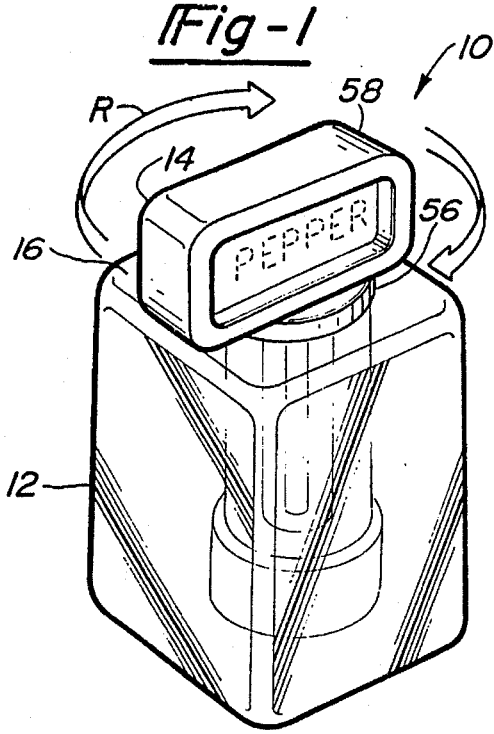
*Fig-1*
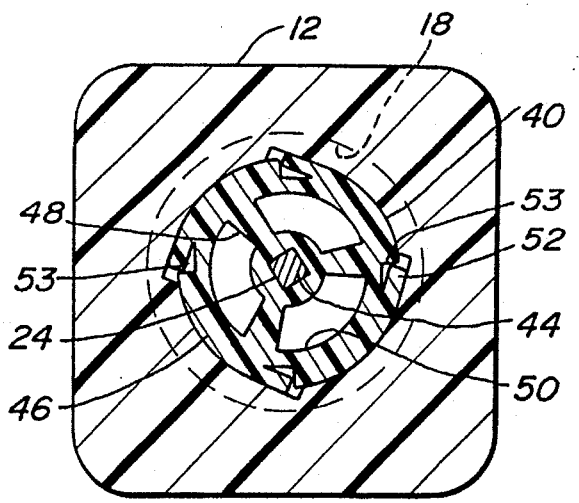
*Fig-3*
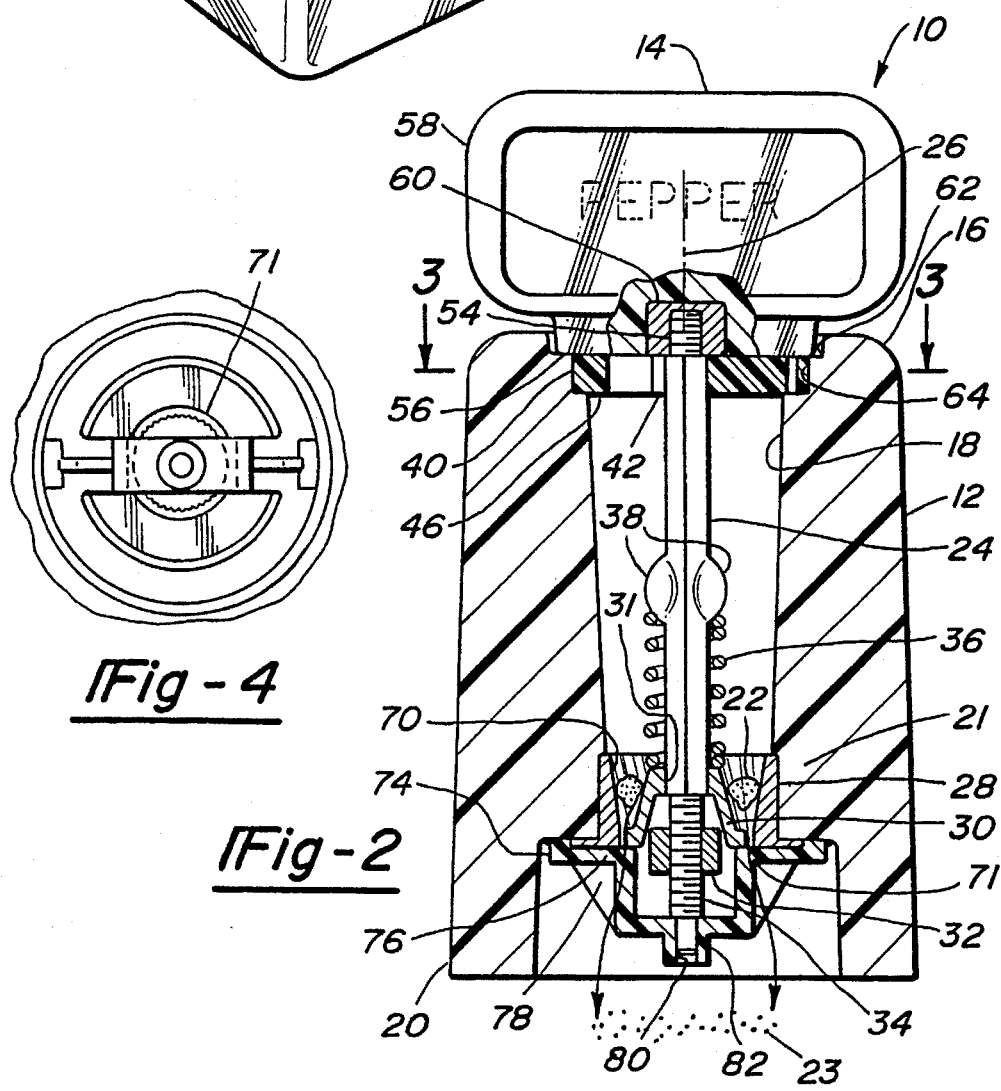
*Fig-4*
*Fig-2*

CONDIMENT MILL WITH A ONE-WAY CLUTCH

FIELD OF THE INVENTION

This invention relates to condiment mills or grinders of the type held with one hand while a hob or top portion is gripped and turned with the other hand to simultaneously grind and dispense a condiment, such as salt or pepper.

BACKGROUND OF THE INVENTION

Widely used condiment mills have a generally cylindrical body with a grinding unit at a lower end portion and an actuating hob at an upper end portion retaining a top or lid of the mill over an opening in the upper portion. An elongated shaft drivingly connects the top with the grinding unit. The use of such hobs serves as a limitation in the design of mill configurations.

It is desired to provide a mill eliminating the need for a separate hob to retain the mill top.

SUMMARY OF THE INVENTION

A condiment mill adapted to grind condiments comprises a mill body, a grinding unit, an elongated shaft, a clutch disc, and a mill top. The mill body defines an elongated mill cavity therein open at an upper end portion and open at a lower end portion. The mill body also has an engaging notch in the upper end portion. The grinding unit is disposed within the mill cavity proximate to the lower end portion and is positioned to receive unground condiment from the mill cavity. The elongated shaft is drivingly engaged with the grinding unit and extends upward therefrom toward the upper end portion and is threaded at an upper end portion thereof. The clutch disc is rotatably fixed to the elongated shaft proximate to the upper end portion. The clutch disc has a clutching tooth extending therefrom operably engaging the notch in the body. The mill top has a threaded portion receiving the threaded upper end of the elongated shaft and also covers the clutch disc. Rotation of the mill top in a first direction relative to the mill body drives the grinding unit to grind the condiment in the cavity. Rotation of the mill in a second direction causes the clutch disc to engage the body and the mill top to thereby unthread from the elongated shaft.

The disclosed mill eliminates the need for a separate knob to retain the mill top. Additionally, the disclosed mill substantially limits rotation of the grinding unit to a single direction.

BRIEF DESCRIPTION OF THE DRAWINGS

FIG. 1 is a perspective view of a preferred embodiment of the condiment mill.

FIG. 2 is a sectional elevational view of the condiment mill of FIG. 1.

FIG. 3 is a cross-sectional view of the condiment mill in the direction of arrows 3—3 of FIG. 2.

FIG. 4 is a partial bottom plan view of the condiment mill of FIG. 1.

DETAILED DESCRIPTION OF A PREFERRED EMBODIMENT

Figure 5:
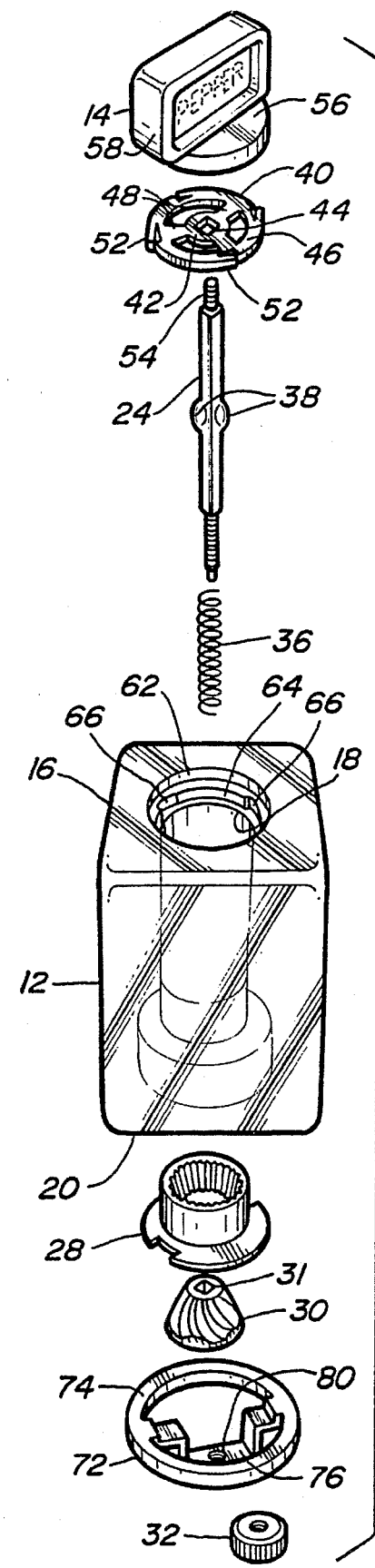
FIG. 5 is an exploded perspective view of the condiment mill of FIG. 1.

A condiment mill 10 as shown in FIG. 1 has a mill 12 body and a selectively removable mill top 14 disposed at an upper end portion 16 of the body. The body 12, as shown in FIG. 2, has a mill cavity 18 extending from the upper end portion 16 of the body 14 to a lower end portion 20 of the mill body 12. The cavity 18 is open at both the upper end portion 16 and the lower end portion 20. A grinding unit 21 is located in the lower end portion of the mill body, within the mill cavity 18. Condiment, such as pepper in the form of peppercorns 23, is introduced to the mill cavity 18 at the upper end portion 16. When the mill top 14 is rotated in direction R, ground pepper 23 exits the condiment mill 10 through the lower end portion 20 of the body 12.

An elongated shaft 24, best shown in FIGS. 2 and 5, extends upward from the grinding unit 22 to the upper end portion 16 of the mill body 12. The shaft 24 is centered on an axis of rotation 25 of the condiment mill 10.

The grinding unit 21 includes a grinding stator 28 fixed within the mill cavity 18. A grinding rotor 30 is rotatively engaged with the elongated shaft 24 for rotation therewith. The rotative engagement is produced by providing the elongated shaft 24 with a square cross-section engaging a complementary square aperture 31 in the rotor 30. There are obviously many well known alternatives to the square shape, such as a D shape, or axial splines which would provide the desired rotative engagement.

An adjusting nut 32 is functionally disposed between the grinding stator 28 and the grinding rotor 30 to limit a separation therebetween. The adjusting nut 32 engages a threaded lower end portion 34 of the elongated shaft 24. A spring 36 is disposed between a spring stop of the shaft 24, provided by shaft upsets 38, and the grinding rotor 30, to bias the rotor 30 away from engagement with the stator 28 and toward the adjusting nut 32.

A clutching disc 40, best shown in FIGS. 3 and 5, has a hub portion 42 with a square aperture 44 rotatably engaging the elongated shaft 24. A rim portion 46 of the clutching disc 40 is connected to the hub portion 42 by a plurality, three in the present embodiment, of radially extending spokes 48. The spokes 48, together with the hub portion 42 and the rim portion 46, define apertures 50 for introducing condiment into the mill cavity 18.

The rim portion 46 has four equally spaced clutching teeth 52 hingedly connected to the rim portion 46 which radially extend beyond a rim diameter in a lock condition. The teeth 52 fold into compatibly shaped pockets 53 in the rim portion 46 when in an overrun condition.

An upper end portion 54 of the elongated shaft 24 is also threaded for engagement with the mill top 14. The mill top 14 has a disc shaped base portion 56 and a handle portion 58 extending from the disc shaped base portion 56. It is to be appreciated that in some embodiments the handle portion 58 and the disc portion 56 may be integrated or provided with configurations not specifically shown here. The mill top 14 also has a metal cap nut 60 with threads engaging the upper end portion 54 of the elongated shaft 24, and axial anti-rotation splines. The cap nut 60 is pressed into a blind hole in the base portion 56.

The mill body 12 has at the upper end portion 16 an upper stepped bore with a first diameter portion 62 sized to provide a clearance diameter with respect to the disc shaped base portion 56. A second diameter portion 64 of the stepped bore provides a clearance diameter with respect to the diameter of the clutching disc rim portion 46. Four equally spaced notches 66 extend radially outward from the second diameter portion 64. These notches 66 are substantially triangular in shape for receiving the clutching teeth 52 of the clutching disc 40.

In the lower end portion 20 of the body 12, the cavity 18 defines a lower stepped bore with a first portion 68 in which is fixed the grinding stator 28. The grinding rotor 30 is nested in the stator 28 and receives the square shaped elongated shaft 24 for rotation therewith. The adjusting nut 32 threads onto the threaded lower end portion 34 of the elongated shaft 24. A V-shaped annular groove 70 as illustrated in FIG. 2 is defined by the combination of the stator 28 and rotor with an open end of the V shaped groove receiving unground condiment from the mill cavity 18. Ground condiment passes out through a much smaller open end 71 shown in FIG. 4.

A grind unit retainer 72 has a rim portion 74 fitting within a second portion 75 of the lower stepped bore, larger than the first portion 68. A strap portion 76 of the grind unit retainer 72 defines a nut pocket disposed beneath the adjusting nut 32. Supporting gussets 78 extend between adjacent horizontally and axially oriented sections of the strap portion 76. A pilot bore 80 passes through the horizontal section of the strap portion 76 on the axis of rotation 26. The elongated shaft 24 has a pilot portion 82 extending from the lower end portion of the elongated shaft 24 and rotatably disposed in the pilot bore 80.

The invention operates in the following manner. As previously described, condiment (peppercorn) in the cavity 18 is ground and dispensed by rotating the mill top 14 relative to the body 12 in direction R. With the threaded upper portion 54 of the elongated shaft and the mating cap nut 60 having right hand threads, direction R is clockwise. Rotation of the mill top 14 in direction R rotates the shaft 24, as well as the clutching disc 40 and grinding rotor 30 in direction R. Rotation of the clutching disc 40 causes the clutching teeth 52 to fold into the pockets 57 in the rim portion 46, permitting free rotation of the disc 40, the shaft 24 and the grinding rotor 30 in the clockwise direction. The grinding rotor 30 rotates relative to the grinding stator 28, crushing the peppercorns ever smaller as they advance down the V-shaped groove 70, and finally passing through the opening 71 between the rotor 30 and stator 28 at the lower portion of the body 12.

When rotated in a counterclockwise direction, opposite the direction R, the mill top 14 may unthread nearly immediately, without substantially displacing the elongated shaft 24, because the grinding rotor 30 resists rotation. Reverse rotation is limited by engagement of the clutching teeth 52 of the clutching disc 40 with the notches 66 in the body 12. The teeth 52, being biased radially outward, tend to follow the perimeter of the surrounding second diameter portion 64 of the upper bore. As the teeth 52 reach the notches 66, they expand into the notches and engage ends of the notches, thereby preventing further rotation of the disc 40, the shaft 24 and the grinding rotor 30 in the counter clockwise direction. When engagement therebetween occurs, the mill top 14 unthreads, permitting its removal, and the mill cavity 18 can be replenished with peppercorns or other desired condiment.

Adjustment of the coarseness of the ground condiment is made by rotating the adjusting nut 32 to axially displace it along the threaded lower end portion 34 of the shaft 24. As the adjusting nut 32 is moved upward, it forces the grinding rotor 32 toward the grinding stator 28, reducing the size of the ground condiment granules. Conversely, as the nut 32 is moved downward, the resultant size of the granules is increased.

The foregoing is considered illustrative of the principles of the invention and as other embodiments or modifications may occur to those skilled in the art, it is not desired to limit the invention to the exact construction and manner of operation shown and described. Rather, all suitable modifications and equivalents, as fall within the scope of the claims, are to be considered within the scope of the invention.

I claim:

1. A condiment mill adapted to grind condiments comprising:

a mill body defining an elongated mill cavity open at an upper end portion of the body and open at a lower end portion of the body and having an engaging notch in the upper end portion;

a grinding unit disposed within the mill cavity proximate to the lower end portion of the body positioned to receive unground condiment from the mill cavity;

an elongated shaft, drivingly engaging the grinding unit and extending upward therefrom toward the opening at the upper end portion, and threaded at an upper end portion;

a clutch disc rotatably fixed to the elongated shaft with a clutching tooth extending therefrom operably engaging the notch in the body; and a mill top having a threaded portion receiving the threaded upper end of the shaft and being of sufficient size to cover the clutch disc wherein rotation of the mill top in a first direction relative to the mill body drives the grinding unit to grind the condiment in the cavity and rotation of the mill top in a second direction causes the clutch disc to engage the body and the mill top to thereby unthread from the elongated shaft.

2. A condiment mill as claimed in claim 1, wherein there is a plurality of clutching teeth.

3. A condiment mill as claimed in claim 1, wherein there is a plurality of engaging notches in the body.

4. A condiment mill as claimed in claim 1, wherein the tooth is radially disposed at an outer periphery of the clutching disc.

5. A condiment mill as claimed in claim 4, wherein the tooth deflects relative to the clutch disc in a radial direction.

6. A condiment mill as claimed in claim 1, wherein:

a hub portion is rotatably engaged with the elongated shaft;

a rim portion has the tooth extending therefrom; and a plurality of spokes extending between the hub and the rim define openings receiving unground condiment.

* * * * *